United States Patent [19]

Roccaforte

[11] Patent Number: 4,506,816
[45] Date of Patent: Mar. 26, 1985

[54] SERRATED CUTTING EDGE FOR SHEET MATERIAL DISPENSER AND METHOD OF FORMING THE SAME

[75] Inventor: Harry I. Roccaforte, Western Springs, Ill.

[73] Assignee: Champion International Corporation, Stamford, Conn.

[21] Appl. No.: 541,689

[22] Filed: Oct. 13, 1983

[51] Int. Cl.³ .............................................. B26D 1/02
[52] U.S. Cl. .................... 225/48; 76/101 R; 76/DIG. 6; 225/91
[58] Field of Search ............................ 225/48, 49, 91; 76/101 R, DIG. 6; 156/527; 493/86

[56] References Cited

U.S. PATENT DOCUMENTS

| | | | |
|---|---|---|---|
| 2,861,753 | 11/1958 | Sipior | 225/49 |
| 3,698,548 | 10/1972 | Stenzel et al. | 225/48 |
| 3,933,288 | 1/1976 | Struble | 225/48 |
| 3,986,440 | 10/1976 | MacDonald et al. | 493/86 |
| 4,371,104 | 2/1983 | Korte | 225/48 |

Primary Examiner—Frank T. Yost
Assistant Examiner—Hien H. Phan
Attorney, Agent, or Firm—Evelyn M. Sommer; William W. Jones

[57] ABSTRACT

The cutting edge for a sheet material dispensing carton has a plastic portion bonded to the paperboard material forming the carton. When the carton blank is formed, the plastic and paperboard are cut concurrently to form one edge of the blank. The paperboard and plastic material forming the teeth of the cutting edge are compressed to increase the sharpness of the cutting edge teeth.

7 Claims, 7 Drawing Figures

SERRATED CUTTING EDGE FOR SHEET MATERIAL DISPENSER AND METHOD OF FORMING THE SAME

This invention relates to an improved material cutting edge formed on a sheet material dispensing carton. More particularly, this invention relates to a cutting edge having improved sharpness, and a method of forming such a cutting edge.

Cartons which are utilized to dispense sheet material from rolls of such material, such as waxed paper, plastic film wrap, metallic foil, and the like are provided with a cutting edge for severing usable amounts of the sheet material being dispensed. The cutting edge is fixed to an edge of the carton and may be made of a plastic or metal strip having a smooth or serrated cutting surface.

It is known in the prior art to form blanks for such cartons wherein the blanks are cut from each other by a single cutting operation which concurrently forms the serrated teeth on the cutting edge of each of the adjacent blanks. Such a procedure is disclosed in U.S. Pat. No. 4,371,104 issued Feb. 1, 1983 to Ralph J. Korte. When this procedure is used to form the carton, blanks will have a plastic serrated cutting member which has underlying paperboard material which is coextensive with the serrated cutting teeth on the plastic cutting member. Thus, the single cutting operation results in a cutting edge which has a serrated plastic component and a serrated paperboard component, and the serrated teeth of both components are coextensive. The coextensiveness of the teeth of both components tends to dull the cutting edge. In order to alleviate this drawback, I have proposed in copending application Ser. No. 334,444 filed Dec. 24, 1981 to remove most of the underlying serrated paperboard component by skiving, thereby providing a cutting edge which has serrated teeth formed substantially only of plastic.

This invention relates to another form of cutting edge, and a method of making the same, which cutting edge has coextensive plastic and paperboard serrated teeth, but which cutting edge exhibits improved sharpness, despite the coextensive paperboard serrated teeth component. In the improved cutting edge of this invention, the plastic and paperboard serrated teeth are compressed in the direction of their thickness when the serrations are formed. The degree of compression is greatest at the tooth points and less at the tooth roots so that the teeth have a relatively flat pyramidal configuration. Thus, each tooth tapers both in the thickness dimension and the width dimension toward the point to increase sharpness and cutting ability of the cutting edge.

It is, therefore, an object of this invention to provide a material dispensing carton having an improved cutting edge thereon.

It is a further object of this invention to provide a carton of the character described having a serrated tooth cutting edge with coexistent plastic and paperboard components adhered to each other.

It is an additional object of the invention to provide a carton of the character described wherein the plastic and paperboard components forming the serrated teeth are compressed so that each tooth tapers in both the thickness and width dimensions toward the point of each tooth to increase the sharpness of the cutting edge.

It is yet another object of this invention to provide a method for forming the cutting edge of the character described.

These and other objects and advantages of the invention will become more readily apparent from the following detailed description of a preferred embodiment of the invention taken in conjunction with the accompanying drawings, in which.

Figure 1:
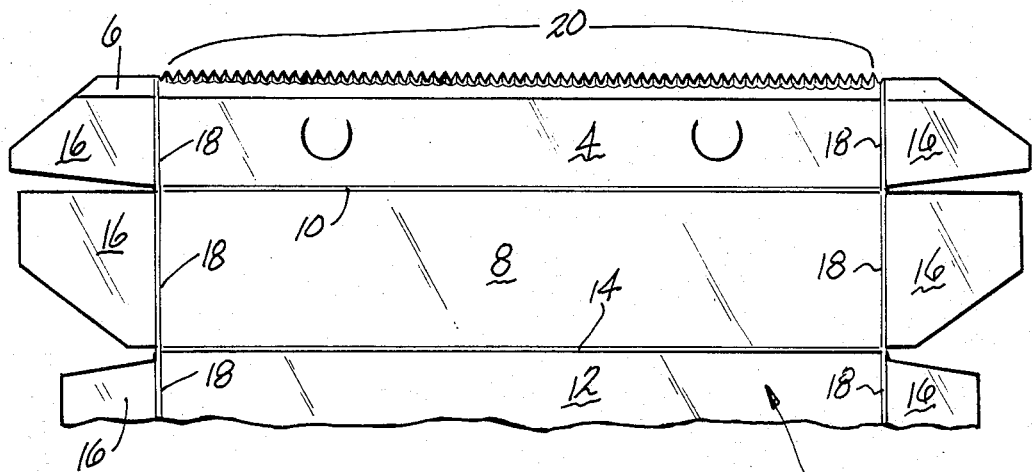
FIG. 1 is a fragmented plan view of a material dispensing carton blank which is equipped with a tear edge formed in accordance with this invention.

Referring now to the drawings, there is shown in FIG. 1 a portion of a paperboard carton blank denoted generally by the numeral 2, which blank is used to form a carton adapted to dispense cut segments of sheet material from a roll thereof to be contained in the carton. The blank 2 includes a front wall panel 4 having a plastic strip 6 bonded to one edge thereof. A bottom or top wall panel 8 is foldably connected to the front wall panel 4 along a fold line 10, and a back wall panel 12 is foldably connected to the bottom or top wall panel 8 along a fold line 14. End closure flaps 16 are foldably connected to opposed end edges of the panels 4, 8 and 12 along fold lines 18. It will be appreciated that additional wall panels and end closure flaps will be included in the complete blank sufficient to form the complete carton. The plastic strip and underlying paperboard material are formed with a series of serrated teeth indicated generally by the numeral 20, thereby forming a cutting edge on the carton for severing usable amounts of sheet material which is dispensed from the roll contained in the carton. The serrated teeth 20 are formed by cutting the plastic strip 6 and the underlying paperboard material concurrently with a cutter bar which will be described in greater detail hereinafter.

Figure 2:
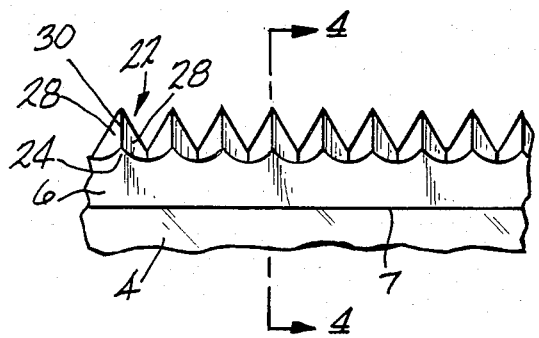
FIG. 2 is a fragmented enlarged plan view of one side of the cutting edge used on the carton of FIG. 1.
Figure 3:
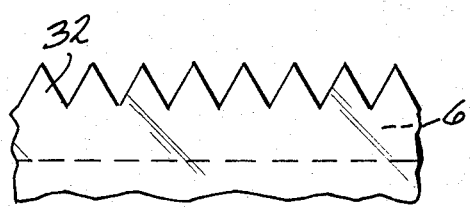
FIG. 3 is a fragmented enlarged plan view of the obverse side of the cutting edge of FIG. 2.
Figure 4:
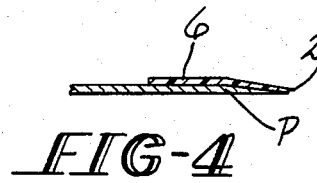
FIG. 4 is a sectional view taken along line 4—4 of FIG. 2.

Referring now to FIGS. 2 and 3, it will be noted that each of the teeth 22 is generally pyramidal in configuration and includes a root portion 24 and a point portion 26. Each tooth 22 further includes a pair of sloping sides 28 which converge at line 30 and which slope down to side edges of a flat underneath side 32. The line 30 slopes down from the root portion 24 to the point portion 26. It will be understood that the plastic strip side of the cutting edge is shown in FIG. 2 and the paperboard side of the cutting edge is shown in FIG. 3. The zone between the tooth root 24 and the straight inner edge 7 of the plastic strip 6 is the full thickness of the combined paperboard and plastic components, whereas the zone between the tooth root 24 and the tooth point 26 has been gradually compressed to accentuate the sharpness of the tooth points 26. The degree of compression is such that the thickness of the teeth points 26 is substantially less than the thickness of the non-compressed plastic and paperboard components at the tooth roots 24. The compression also tends to sharpen the edges of the teeth formed by convergence of the wall 32 and the walls 28. Due to the respective natures of the plastic material and the paperboard material, the majority of the compression occurs in the paperboard component layer. It will also be noted that the plastic and paperboard layers are coexistent in each of the teeth 22, and that the increased sharpening of the teeth points 26 and edges is due solely to compression of the components of the cutting edge when the teeth 22 are formed. FIG. 4 shows the coexistence of the plastic 6 and paperboard P components in the tooth area and shows the degree to which the paperboard is compressed at the point 26 of the tooth.

Figure 5:
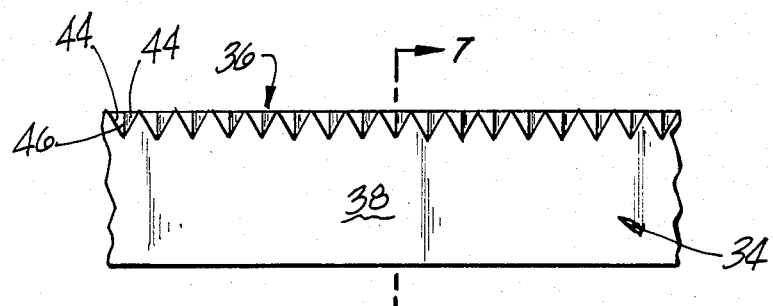
FIG. 5 is a front elevational view of a cutter bar used to form the cutting edge of FIG. 2.
Figure 7:
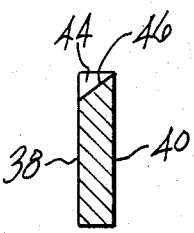
FIG. 7 is a sectional view of the cutter bar taken along line 7—7 of FIG. 5.
Figure 6:
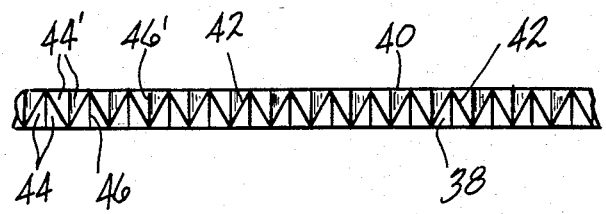
FIG. 6 is a top plan view of the cutter bar of FIG. 5.

Referring now to FIGS. 5-7, the cutter bar with which the cutting edge is formed is shown. The cutter bar is denoted generally by the numeral 34 and includes a cutting face 36 and planar side surfaces 38 and 40. The cutting face 36 has formed thereon a zigzag cutting line 42, which in turn is formed by complimentary inclined recessed planar surfaces 44 and 44' which intersect the planar sides 38 and 40 respectively of the cutter bar 34 and which meet at inclined lines of juncture 46 and 46' respectively. When the paperboard component of the composite is relatively thick, then the compression thereof can be accomplished in a relatively gradual manner by providing steeper angles of inclination for the planar surfaces 44 and 44'. On the other hand, when the paperboard component of the composite is relatively thin, then the compression thereof should be accomplished in a more accelerated manner by providing flatter angles of inclination for the planar surfaces 44 and 44'.

To form the cutting edge of the carton, the composite paperboard-plastic strip portion of the carton blank is disposed on a preferably flat supporting surface and the cutting face of the cutter bar is pressed against the open side of the composite, whereby the serrated severing line will be formed on the composite. The converging inclined surfaces 44 and 44' will compress the edges and points of the teeth on the cutting edge progressively until the composite is severed through. In this manner, the compressed and sharpened cutter teeth will be formed on the cutting edge. The cutter bar can be pressed against the plastic side of the composite or against the paperboard side of the composite during the forming operation. Pressing against the plastic side is preferred to minimize delamination of the paperboard during the forming operation. The cutter tool can take the form of the linear cutter bar shown in the drawings, or, alternatively can take the form of a cutter wheel with a circumferential cutter face formed as shown in the drawings.

It will be readily appreciated that the forming method of this invention will result in a plastic-paperboard composite cutting edge having improved sharpness without the need of removing any of the paperboard component of the composite in the toothed area. The increased sharpness is the result of the reduction in thickness of the composite, which is the result of progressive compression or compaction of the components of the composite during the forming operation. The compression is at its greatest at the edges and points of the teeth and occurs primarily in the paperboard component of the composite.

Since many changes and variations of the disclosed embodiment of this invention may be made without departing from the inventive concept, it is not intended to limit the invention otherwise than as required by the appended claims.

What is claimed is:

1. In a carton for dispensing sheet material from a roll thereof, a cutting edge for severing portions of the sheet material from the roll, said cutting edge comprising:
   (a) a composite comprising a plastic sheet component and a paperboard component bonded together in face-to-face contact;
   (b) a plurality of cutting teeth formed in said composite with each of said teeth comprising side edges which coverage from a root portion to a point portion;
   (c) said sheet component and said paperboard component of said composite being coextensive with each other from said root portions to said side edges and said point portions of said cutting teeth; and
   (d) said cutting teeth being compacted with the thickness of said composite being reduced at said side edges and said point portions of said cutting teeth while the thickness of said composite is substantially non-reduced at said root portions of said cutting teeth.

2. The cutting edge of claim 1 wherein the compaction of said composite is concentrated primarily in said paperboard component of said composite.

3. The cutting edge of claim 1 wherein each of said cutting teeth has a substantially flat pyramidal configuration having a first substantially planar surface on one face of each tooth and second and third substantially planar surfaces on the opposite face of each tooth, said second and third planar surfaces merging along a line which tapers down from said root portion to said point portion of each tooth and said second and third planar surfaces being inclined with respect to said first planar surface to meet with the latter at said side edges of each tooth.

4. In a carton for dispensing sheet material from a roll thereof, a cutting edge for severing portions of the sheet material from the roll, said cutting edge comprising:
   (a) a plurality of cutting teeth formed at one edge of one panel on said carton;
   (b) each of said teeth being substantially pyramidal in configuration and including side edges which converge from a root portion to a point portion;
   (c) each of said cutting teeth including a paperboard component which extends from said root portion to said side edges and said point portion; and
   (d) the pyramidal configuration of each tooth being formed by a first planar surface on one face of the tooth and second and third substantially planar surfaces on the other face of the tooth, said second and third surfaces merging at a mid line which tapers down from said root portion to said point portion of the tooth, and said second and third surfaces further tapering down from said mid line to meet said first surface at said side edges of the tooth, said paperboard component being progressively compacted from said root portion to said side edges and said point portion of the tooth to sharpen the tooth.

5. The cutting edge of claim 4, further comprising a plastic component bonded to said paperboard component and coextensive therewith over the entirety of each of said cutting teeth.

6. In a carton for dispensing sheet material from a roll thereof, a cutting edge for severing portions of the sheet material from the roll, said cutting edge comprising:

(a) a composite comprising a plastic component and a paperboard component positioned at one edge of a panel on the carton;

(b) a plurality of cutting teeth formed in said composite with each of said components being coextensive throughout the entirety of said cutting teeth; and (c) each of said cutting teeth tapering from a relatively thick root portion to relatively thin side edges and a point portion with the paperboard component being progressively compacted from said root portion to said side edges and said point portion to sharpen each of said cutting teeth.

7. A method for forming a cutting edge on a paperboard carton blank, said method comprising the steps of:

(a) supporting an area of said blank wherein said cutting edge is to be formed;

(a) providing a cutting tool having a cutting face with a serrated cutting line thereon;

(c) pressing said cutting face of said tool against said area of said blank to form a serrated cutting edge on said blank having a plurality of cutting teeth comprising root portions and side edges converging at point portions; and (d) progressively compressing the paperboard on said blank while severing said blank with said tool to compact the paperboard at said edges and said point portion of each of said cutting teeth to a greater degree than at said root portion to form each of said teeth with a tapered sharpened profile.

* * * * *